United States Patent
Samuelsson et al.

(10) Patent No.: US 10,893,288 B2
(45) Date of Patent: *Jan. 12, 2021

(54) DECODERS AND METHODS THEREOF FOR MANAGING PICTURES IN VIDEO DECODING PROCESS

(71) Applicant: Telefonaktiebolaget LM Ericsson (publ), Stockholm (SE)

(72) Inventors: Jonatan Samuelsson, Enskede (SE); Rickard Sjöberg, Stockholm (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,327

(22) Filed: Apr. 27, 2020

(65) Prior Publication Data

US 2020/0260099 A1 Aug. 13, 2020

Related U.S. Application Data

(63) Continuation of application No. 13/637,242, filed as application No. PCT/SE2012/050992 on Sep. 20, 2012, now Pat. No. 10,674,171.

(Continued)

(51) Int. Cl.
*H04N 19/50* (2014.01)
*H04N 19/46* (2014.01)
(Continued)

(52) U.S. Cl.
CPC ............ *H04N 19/50* (2014.11); *H04N 19/31* (2014.11); *H04N 19/44* (2014.11); *H04N 19/46* (2014.11)

(58) Field of Classification Search
CPC .. H04N 19/00533; H04N 19/31; H04N 19/44; H04N 19/50; H04N 19/46
See application file for complete search history.

(56) References Cited

U.S. PATENT DOCUMENTS

| 9,237,356 B2 | 1/2016 | Wang et al. |
| 2007/0183494 A1 | 8/2007 | Hannuksela |

(Continued)

FOREIGN PATENT DOCUMENTS

| WO | 9617478 A1 | 6/1996 |
| WO | 2007080223 A1 | 7/2007 |
| WO | 2008033951 A2 | 3/2008 |

OTHER PUBLICATIONS

Chen, Y., "A New Reference Picture Lists Construction Process for Spatial Enhancement Layer (revision 1)", Joint Video Team (JVT) of ISO/IEC MPEG & ITU-T VCEG (ISO/IEC JTC1/SC29IWG11 and ITU-T SG16 a.6), 18th Meeting: Bangkok, Thailand, Jan. 14, 2006, pp. 1-13, Document: JVT-R028, Filename: JVT-R028r1.doc, XP03000629, Thomson R&D.

(Continued)

*Primary Examiner* — Joseph G Ustaris
*Assistant Examiner* — Jill D Sechser
(74) *Attorney, Agent, or Firm* — Coats & Bennett, PLLC

(57) ABSTRACT

The solution presented herein defines from which previously decoded picture to retrieve the values for calculating POC of the current picture regardless of how many temporal layers have been decoded. That is achieved by determining the POC of the current picture, to be used by the decoder, as a sum of a syntax element pic_order_cnt_lsb and most significant bits of the POC, PicOrderCntMsb, of the current picture, wherein the PicOrderCntMsb of the current picture is derived using at least a prevPicOrderCntMsb and a prevPicOrderCntLsb and the prevPicOrderCntMsb is set equal to the most significant bits of the POC of a previous (Continued)

reference picture in decoding order that has a layer identity equal to zero and prevPicOrderCntLsb is set equal to the value of the least significant bits of the POC of a previous reference picture in decoding order that has a layer identity equal to zero.

6 Claims, 5 Drawing Sheets

Related U.S. Application Data

(60) Provisional application No. 61/539,539, filed on Sep. 27, 2011.

(51) Int. Cl.
*H04N 19/44* (2014.01)
*H04N 19/31* (2014.01)

(56) References Cited

U.S. PATENT DOCUMENTS

| | | |
|---|---|---|
| 2008/0137742 A1 | 6/2008 | Chen et al. |
| 2010/0142617 A1 | 6/2010 | Koo et al. |
| 2012/0140825 A1 | 6/2012 | Huang et al. |
| 2013/0089152 A1* | 4/2013 | Wang .................. H04N 19/102 375/240.23 |
| 2017/0208342 A1* | 7/2017 | Deshpande .......... H04N 19/105 |
| 2019/0342562 A1* | 11/2019 | Hannuksela ........... H04N 19/70 |

OTHER PUBLICATIONS

Shen, Q. et al., "Buffer Requirement Analysis and Reference Picture Marking for Temporal Scalable Video Coding", Packet Video 2007, Conference Publication, Nov. 12, 2007, pp. 91-97, E-ISBN : 978-1-4244-0981-5, XP31170603, IEEE.

Sjoberg, R. et al., "Absolute Signaling of Reference Pictures", Joint Collaborative Team on Video Coding (JCT-VC) of ITU-T SG16 WP3 and ISO/IEC JTC1/SC29/WG11 6th Meeting: Torino, 2011, Jul. 1, 2011, pp. 1-10, Document: JCTVC-F493, WG11 No. m20923, XP30009516.

Joshi, R. et al., "Temporally Adaptive POC Coding", Joint Collaborative Team on Video Coding (JCT-VC) of ITU-T SG16 WP3 and ISO/IEC JTC1/SC29/WG11, 9th Meeting: Geneva, CH, Apr. 27, 2012, pp. 1-8, Document: JCTVC-I0345 r1, XP30052935.

Boyce, J. et al., "High Layer Syntax to Improve Support for Temporal Scalability", Joint Collaborative Team on Video Coding (JCT-VC) of ITU-T SG16 WP3 and ISO/IEC JTC1/SC29/WG11, 4th Meeting: Daegu, KR, Jan. 20, 2011, pp. 1-14, Document: JCTVC-D200, XP30008240.

Bross, B, et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting: Torino, Jul. 14, 2011, Document: JCTVC-F803_d1, pp. 1-222.

* cited by examiner

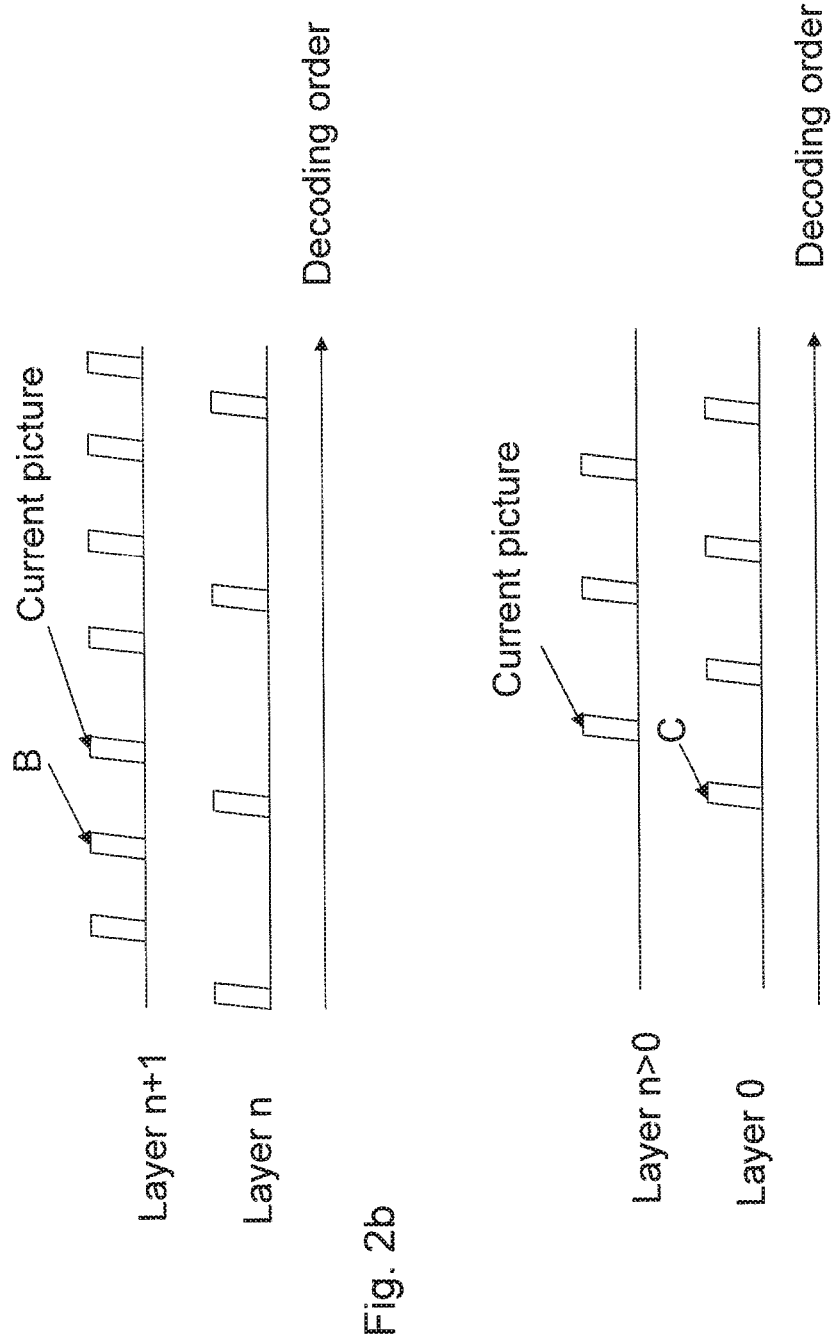

DECODERS AND METHODS THEREOF FOR MANAGING PICTURES IN VIDEO DECODING PROCESS

RELATED APPLICATIONS

This application is a continuation of prior U.S. application Ser. No. 13/637,242, filed 25 Sep. 2012, which was the National Stage of International Application PCT/SE2012/050992 filed 20 Sep. 2012, which claims the benefit of U.S. Provisional Application No. 61/539,539, filed 27 Sep. 2011, the entire disclosure of each being hereby incorporated by reference herein.

TECHNICAL FIELD

The embodiments generally relate to management of pictures in a video encoding/decoding process.

BACKGROUND

H.264, also referred to as Moving Picture Experts Group-4 (MPEG-4) Advanced Video Coding (AVC), is the state of the art video coding standard. It consists of a block based hybrid video coding scheme that exploits temporal and spatial redundancies.

H.264 uses previously decoded pictures for temporal prediction when decoding encoded pictures. These pictures are called reference pictures and there may be more than one reference picture used for decoding a picture. For each reference picture in H.264, there is a codeword frame_num that acts as a label for the reference picture. The frame_num indicates the decoding order and the frame_num must increase by 1 for each reference picture in decoding order otherwise the bitstream is not compliant to the standard. H.264 also specifies a picture order count (POC) for each picture that the decoder uses to output (display) the pictures in the correct order using either a process called the bumping process or using picture timing information. In short, the bumping process waits with display as long as it is possible. Then the picture with the lowest POC that exist in the decoded picture buffer is output (displayed). To determine what picture to display, it is important that the lowest POC is properly defined. An H.264 bitstream always start with a picture that has POC=0. In contrast to frame_num, POC does not need to be incremented by 1, it can be arbitrarily incremented. The maximum POC value is $2^{31}-1$. It is common to use POC type 0 in H.264. For this POC type, the n least significant bits of the POC are signaled in the bitstream. POC is then calculated as:

PicOrderCnt=PicOrderCntMsb+pic_order_cnt_lsb where pic_order_cnt_lsb is the least significant bits as signaled in the slice header and PicOrderCntMsb is the most significant bits calculated using the syntax element pic_order_cnt_lsb, PrevPicOrderCntLsb and PrevPicOrderCntMsb, where PrevPicOrderCntLsb and PrevPicOrderCntMsb are the values of the previous reference picture in decoding order.

Note that this is different to frame_num, which wraps around. Wrap around means that the frame_num of different pictures increases up to a specific value at which it is reset to zero. POC does not wrap-around.

High Efficiency Video Coding (HEVC) is a new video coding standard currently being developed in Joint Collaborative Team—Video Coding (JCT-VC). JCT-VC is a collaborative project between MPEG and International Telecommunication Union Telecommunication standardization sector (ITU-T).

In H.264/AVC, and HEVC all encoded data is put in Network Abstraction Layer (NAL) units. The NAL unit consists of the encoded data and a NAL unit header. In HEVC there is a temporal_id syntax element in the NAL unit header with information about the temporal layer of the current picture. It is defined in HEVC that a picture with temporal_id=tIdA cannot reference a picture with temporal_id=tIdB if tIdA is less than tIdB.

Thus, pictures in higher temporal layers, identified by temporal_id, can not be used for prediction in lower temporal layers, but pictures in lower temporal layers can be used for prediction in higher temporal layers as illustrated in FIG. 1. The decoding order is the order in which pictures are decoded and the order in which compressed pictures are fed into the decoder. The system is responsible to feed the decoder with the pictures in the right order. If pictures are not in the right order, decoding may not be possible. The picture order count (POC) is assigned for each picture to be used by the decoder to output (display) the pictures in the correct order. Sometimes, in some or all pictures, depending on the coding structure, pictures in one temporal layer are used for prediction by other pictures in the same temporal layer. There are very few, if any, practical use-cases for having pictures in any other temporal layer than the highest temporal layer that are not at all used for prediction. It can therefore be assumed that all pictures in temporal layers lower than the highest temporal layer will be used for prediction by at least one picture in the same or higher temporal layers.

A sub-stream containing pictures of a range of temporal_id can be created from an HEVC bitstream through removal of all pictures belonging to layers higher than temporal layer T, for any chosen T. For example, if a bitstream has four temporal layers {0,1,2,3}, a bitstream where the temporal layers 2 and 3 has been removed is fully decodable by an HEVC decoder.

Further, a picture in HEVC is partitioned into one or more slices, where each slice is an independently decodable segment of the picture. This means that if a slice is missing, for instance got lost during transmission, the other slices of that picture can still be decoded correctly. In order to make slices independent, they do not depend on each other. No bitstream element of another slice is required for decoding any element of another slice.

Each slice contains a slice header which independently provides all required data for the slice to be independently decodable. One example of a data element present in the slice header is the slice address, which is used for the decoder to know the spatial location of the slice. Another example is the slice quantization delta which is used by the decoder to know what quantization parameter to use for the start of the slice. There are many more data elements in the slice header.

In HEVC, absolute signaling of reference pictures is used instead of signaling reference picture modifications in a relative way as in previous standards, such as H.264. The absolute signaling is realized by a list of reference pictures, referred to as a Reference Picture Set that is signaled for each picture either explicitly or by using a reference to a Sequence Parameter Set (SPS). Picture Order Count (POC) is used in HEVC to define the display order of pictures and also to identify reference pictures.

In the H.264 design POC is most often signaled by the least significant bits. In HEVC POC is always signaled by the least significant bits, except for Instant Decoder Refresh (IDR) pictures for which POC is inferred to be equal to 0.

POC is calculated using values from the previous reference picture in decoding order. When temporal layers are present in an HEVC bitstream, a decoder may choose to decode only a subset of the pictures in the bitstream, i.e. those pictures with a temporal_id lower than a specific value. Thus, which picture that is the previous reference picture for a certain picture P may depend on the number of layers that are decoded by the decoder which may result in different POC values for P for different decoders. This is something that must be avoided in order to have a stable temporally scalable specification.

SUMMARY

An object with the embodiments of the present invention is to make it well defined from which previously decoded picture to retrieve the values for calculating POC of the current picture regardless of how many temporal layers have been decoded.

That is achieved according to a first and second aspect by determining the POC of the current picture, to be used by the decoder, as a sum of a syntax element pic_order_cnt_lsb and a most significant bits of the POC, PicOrderCntMsb, of the current picture, wherein the PicOrderCntMsb of the current picture is derived using at least a prevPicOrderCntMsb and a prevPicOrderCntLsb and the prevPicOrderCntMsb is set equal to the most significant bits of the POC of a previous reference picture in decoding order that has a layer identity equal to or lower than the layer identity of the current picture and prevPicOrderCntLsb is set equal to the value of the least significant bits of the POC of a previous reference picture in decoding order that has a layer identity equal to or lower than the layer identity of the current picture.

Hence, according to a first aspect, a method of decoding a representation of a current picture of a video stream of multiple pictures using reference pictures is provided. Each picture belongs to a layer identified by a layer identity. In the method, least significant bits of a POC value (e.g. the pic_order_cnt_lsb) of the current picture is received from a bitstream, and the POC value of the current picture, is determined as a sum of the pic_order_cnt_lsb and most significant bits of the POC value (PicOrderCntMsb) of the current picture. The PicOrderCntMsb of the current picture is derived using at least a prevPicOrderCntMsb and a prevPicOrderCntLsb and the prevPicOrderCntMsb is set equal to the most significant bits of the POC value of a previous reference picture in decoding order that has a layer identity equal to or lower than the layer identity of the current picture and prevPicOrderCntLsb is set equal to the value of the least significant bits of the POC value of a previous reference picture in decoding order that has a layer identity equal to or lower than the layer identity of the current picture.

According to a second aspect, a decoder configured to decode a representation of a current picture of a video stream of multiple pictures using reference pictures is provided. Each picture belongs to a layer identified by a layer identity. The decoder is configured to receive least significant bits of a POC value (e.g. pic_order_cnt_lsb) of the current picture from a bitstream, and the decoder comprises a processor configured to determine the POC value of the current picture, to be used by the decoder, as a sum of the pic_order_cnt_lsb and most significant bits of the POC value (PicOrderCntMsb) of the current picture. The PicOrderCntMsb of the current picture is derived using at least a prevPicOrderCntMsb and a prevPicOrderCntLsb and the prevPicOrderCntMsb is set equal to the most significant bits of the POC value of a previous reference picture in decoding order that has a layer identity equal to or lower than the layer identity of the current picture and prevPicOrderCntLsb is set equal to the value of the least significant bits of the POC value of a previous reference picture in decoding order that has a layer identity equal to or lower than the layer identity of the current picture.

The object is also achieved according to a third and a fourth aspect of the present invention by determining the POC of the current picture, to be used by the decoder, as a sum of a syntax element pic_order_cnt_lsb and a most significant bits of the POC, PicOrderCntMsb, of the current picture, wherein the PicOrderCntMsb of the current picture is derived using at least a prevPicOrderCntMsb and a prevPicOrderCntLsb and the prevPicOrderCntMsb is set equal to the most significant bits of the POC of a previous reference picture in decoding order that has a layer identity equal to zero and prevPicOrderCntLsb is set equal to the value of the least significant bits of the POC of a previous reference picture in decoding order that has a layer identity equal to zero.

Hence, according to a third aspect, a method of decoding a representation of a current picture of a video stream of multiple pictures using reference pictures is provided. Each picture belongs to a layer identified by a layer identity. In the method, least significant bits of a POC value (e.g. the pic_order_cnt_lsb) of the current picture is received from a bitstream, and the POC value of the current picture, is determined as a sum of the pic_order_cnt_lsb and most significant bits of the POC value (PicOrderCntMsb) of the current picture. The PicOrderCntMsb of the current picture is derived using at least a prevPicOrderCntMsb and a prevPicOrderCntLsb and the prevPicOrderCntMsb is set equal to the most significant bits of the POC value of a previous reference picture in decoding order that has a layer identity equal to zero and prevPicOrderCntLsb is set equal to the value of the least significant bits of the POC value of a previous reference picture in decoding order that has a layer identity equal to zero.

According to a fourth aspect, a decoder configured to decode a representation of a current picture of a video stream of multiple pictures using reference pictures is provided. Each picture belongs to a layer identified by a layer identity. The decoder is configured to receive least significant bits of a POC value (e.g. pic_order_cnt_lsb) of the current picture from a bitstream, and the decoder comprises a processor configured to determine the POC value of the current picture, to be used by the decoder, as a sum of the pic_order_cnt_lsb and most significant bits of the POC value (PicOrderCntMsb) of the current picture. The PicOrderCntMsb of the current picture is derived using at least a prevPicOrderCntMsb and a prevPicOrderCntLsb and the prevPicOrderCntMsb is set equal to the most significant bits of the POC value of a previous reference picture in decoding order that has a layer identity equal to zero and prevPicOrderCntLsb is set equal to the value of the least significant bits of the POC value of a previous reference picture in decoding order that has a layer identity equal to zero.

An advantage with embodiments of the present invention is that they provide a definition of the POC regardless of the number of temporal layers that have been received by the decoder.

BRIEF DESCRIPTION OF THE DRAWINGS

FIG. 2b shows how the POC is determined according to the first and second aspects while FIG. 2c shows how the POC is determined according to the third and fourth aspects of the embodiments of the present invention.

DETAILED DESCRIPTION

As described above, the encoder has to indicate to the decoder in which order the pictures should be output or displayed. That is done by using POC values as described above. To calculate the POC of the current picture, the variables prevPicOrderCntMsb and prevPicOrderCntLsb are calculated from a previous reference picture. Thus it is needed to identify what previous reference picture to retrieve these values from in a way that is independent of how many layers the decoder decodes.

It should be noted that when the current picture is the first received, i.e. when there are no previous reference pictures, the prevPicOrderCntMsb and prevPicOrderCntLsb are set to 0 and thus also the POC value. When the current picture is the second received picture, the prevPicOrderCntMsb and the prevPicOrderCntLsb are equal to 0, but the pic_order_cnt_lsb which is sent with the current picture is used together with the prevPicOrderCntMsb and the prevPicOrderCntLsb to calculate the POC value for that current picture. Further, the prevPicOrderCntMsb and the prevPicOrderCntLsb are stored at the decoder.

Figure 1:
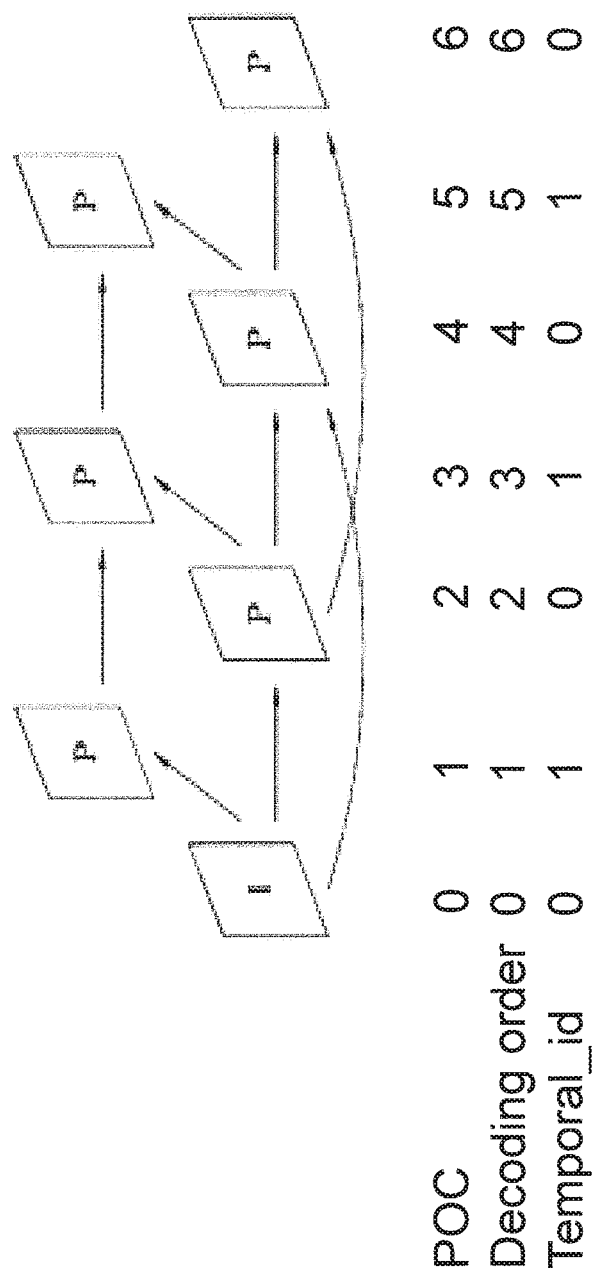
FIG. 1 schematically illustrates an example of a coding structure with two temporal layers according to prior art.
Figure 2A:
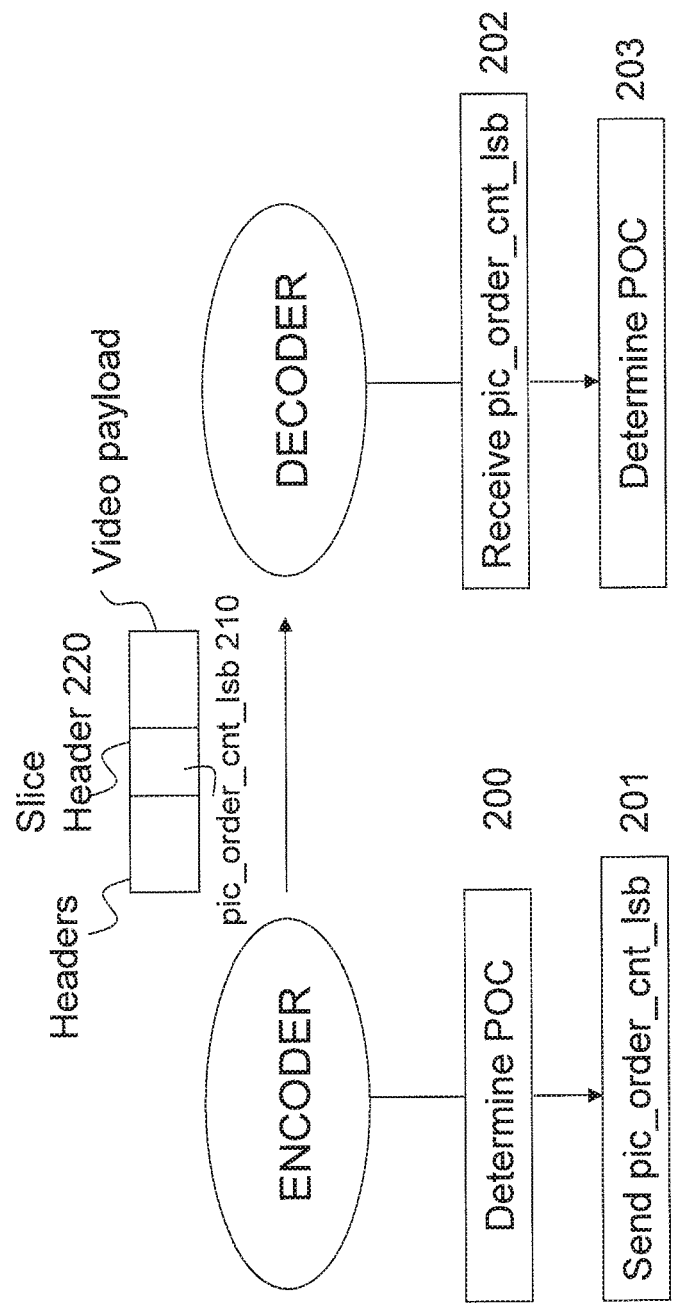
FIG. 2a illustrates a flowchart of a method in a decoder according to embodiments of the present invention.

In the flowcharts of FIG. 2a, a method of encoding and a method of decoding a representation of a current picture of a video stream of multiple pictures using reference pictures are illustrated according to a first and a third aspect. A POC value indicates to a decoder an order in which the current picture should be output or displayed and each picture belongs to a layer identified by a layer identity.

The encoder determines 200 the POC value and sends 201 a syntax element 210 indicative of least significant bits of the POC value of the current picture (referred to as pic_order_cnt_lsb) to a decoder, and the decoder receives 202 said pic_order_cnt_lsb of the current picture. The pic_order_cnt_lsb may be sent in the slice header as illustrated in FIG. 2a. The pic_order_cnt_lsb is used to determine 203 the POC value of the current picture to be used by the decoder. Further, the POC value of the current picture is determined by the decoder as a sum of the pic_order_cnt_lsb and most significant bits of the POC value, PicOrderCntMsb, of the current picture. The PicOrderCntMsb of the current picture are derived using at least a prevPicOrderCntMsb and a prevPicOrderCntLsb and the prevPicOrderCntMsb are set equal to the most significant bits of the POC value of a previous reference picture in decoding order that has a layer identity equal to or lower than the layer identity of the current picture and the prevPicOrderCntLsb are set equal to the value of the least significant bits of the POC (referred to as pic_order_cnt_lsb) of a previous reference picture in decoding order that has a layer identity equal to or lower than the layer identity of the current picture according to the first aspect. The previous reference picture in decoding order used for determining the POC, is the closest previous reference picture to the current picture. The closest reference picture in decoding order that fulfils a certain condition (e.g. that the layer identity of the reference picture is equal to or lower than the layer identity of the current picture) is equivalent to the last decoded reference picture that fulfils the condition. The previous reference picture used for the prevPicOrderCntLsb is preferably the same as the previous reference picture used for the prevPicOrderCntMsb.

Hence, PicOrderCntMsb of the current picture is derived using the values of prevPicOrderCntMsb and prevPicOrderCntLsb. The following pseudo-code gives an example how that can be done:

```
if( ( pic_order_cnt_lsb < prevPicOrderCntLsb ) &&
   ( ( prevPicOrderCntLsb - pic_order_cnt_lsb ) >=
   ( MaxPicOrderCntLsb / 2 ) ) )
    PicOrderCntMsb = prevPicOrderCntMsb + MaxPicOrderCntLsb
else if( ( pic_order_cnt_lsb > prevPicOrderCntLsb ) &&
   ( ( pic_order_cnt_lsb - prevPicOrderCntLsb ) >
   ( MaxPicOrderCntLsb / 2 ) ) )
    PicOrderCntMsb = prevPicOrderCntMsb - MaxPicOrderCntLsb
else
    PicOrderCntMsb = prevPicOrderCntMsb
``` where MaxPicOrderCntLsb is set to the maximum possible value of pic_order_cnt_lsb+1. The value of MaxPicOrderCntLsb may be calculated from a syntax element log2_max_pic_order_cnt_lsb_minus4 which is signaled in the SPS.

Then PicOrderCnt of the current picture is calculated as:

PicOrderCnt=PicOrderCntMsb+pic_order_cnt_lsb

Moreover, the decoder receives the pic_order_cnt_lsb 210 by decoding the slice header 220 including parsing the syntax element pic_order_cnt_lsb 210. The previous reference picture in decoding order that has a layer identity, such as a temporal_id, equal to or lower than the temporal_id of the current picture is identified as picture B exemplified by FIG. 2b, where it is shown that the closest reference picture has a layer identity equal to the layer of the the current picture.

The value of PicOrderCntMsb is calculated from pic_order_cnt_lsb, PrevPicOrderCntLsb and PrevPicOrderCntMsb where PrevPicOrderCntLsb and PrevPicOrderCntMsb are the values of picture B.

According to a third aspect, the encoder determines 200 the POC value and sends 201 a syntax element 210 indicative of least significant bits of the POC value of the current picture (referred to as pic_order_cnt_lsb) to a decoder, and the decoder receives 202 said pic_order_cnt_lsb of the current picture. The pic_order_cnt_lsb may be sent in the slice header as illustrated in FIG. 2a. The pic_order_cnt_lsb is used to determine 203 the POC value of the current picture to be used by the decoder. Further, the POC value of the current picture is determined by the decoder as a sum of the pic_order_cnt_lsb and most significant bits of the POC value, PicOrderCntMsb, of the current picture. The PicOrderCntMsb of the current picture are derived using at least a prevPicOrderCntMsb and a prevPicOrderCntLsb and the prevPicOrderCntMsb are set equal to the most significant bits of the POC value of a previous reference picture in decoding order that has a layer identity equal to zero and the prevPicOrderCntLsb are set equal to the value of the least significant bits of the POC (referred to as pic_order_cnt_lsb) of a previous reference picture in decoding order that has a layer identity equal to zero according to the third aspect. The previous reference picture in decoding order used for determining the POC, is the closest previous reference pictures in decoding order to the current picture. The closest reference picture in decoding order that fulfils a certain condition (e.g.

that the layer identity of the reference picture is equal to zero) is equivalent to the last decoded reference picture that fulfils the condition.

As an example, the prevPicOrderCntMsb is set equal to PicOrderCntMsb of the previous reference picture in decoding order that has a layer identity, such as a temporal_id, equal to 0 and prevPicOrderCntLsb is set equal to the value of pic_order_cnt_lsb of the previous reference picture in decoding order that has a temporal_id equal to 0.

PicOrderCntMsb of the current picture is derived using the values of prevPicOrderCntMsb and prevPicOrderCntLsb, as exemplified by the following pseudo-code:

```
if( ( pic_order_cnt_lsb < prevPicOrderCntLsb ) &&
  ( ( prevPicOrderCntLsb − pic_order_cnt_lsb ) >=
  ( MaxPicOrderCntLsb / 2 ) ) )
  PicOrderCntMsb = prevPicOrderCntMsb + MaxPicOrderCntLsb
else if( ( pic_order_cnt_lsb > prevPicOrderCntLsb ) &&
  ( ( pic_order_cnt_lsb − prevPicOrderCntLsb ) >
  ( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
``` where MaxPicOrderCntLsb is set to the maximum possible value of pic_order_cnt_lsb+1.

Then PicOrderCnt of the current picture is calculated as:
PicOrderCnt=PicOrderCntMsb+pic_order_cnt_lsb In other words, the variables prevPicOrderCntLsb and prevPicOrderCntMsb are derived as follows. Let prevTid0Pic be the previous reference picture in decoding order that has temporal_id equal to 0. The variable prevPicOrderCntLsb is set equal to pic_order_cnt_lsb of prevTid0Pic, and the variable prevPicOrderCntMsb is set equal to PicOrderCntMsb of prevTid0Pic.

The previous reference picture is the closest previous reference picture in decoding order that has temporal_id equal to 0, i.e. the picture with temporal_id equal to 0, can be found by examining in reverse decoding order all reference pictures that preceded the current picture in decoding order until one with temporal_id equal to 0 is found. That is as exemplified by FIG. 2c, let picture C be the picture that is immediately before the current picture in decoding order. If picture C has temporal_id equal to 0, picture C is identified as prevTid0Pic. Otherwise the picture immediately before picture C in decoding order is examined and so on.

The decoder is configured to receive the pic_order_cnt_lsb by parsing of the syntax element pic_order_cnt_lsb. The previous reference picture in decoding order that has a temporal_id equal to 0 is identified as picture prevTid0Pic. The value of PicOrderCntMsb for the current picture is calculated from pic_order_cnt_lsb of the current picture, PrevPicOrderCntLsb and PrevPicOrderCntMsb where PrevPicOrderCntLsb and PrevPicOrderCntMsb are the values of picture prevTid0Pic. PicOrderCnt for the current picture is calculated from PicOrderCntMsb and pic_order_cnt_lsb, e.g. as PicOrderCnt=PicOrderCntMsb+pic_order_cnt_lsb.

In a further embodiment valid for the first, second, third and fourth aspects, the layer is a temporal layer and the layer identifier corresponds to temporal_id. However, the process described above can also support other modes of scalability than temporal scalability. In this case, the previous picture is defined as the previous picture in decoding order for which all scalability layer identifiers fulfill the condition that the layer identifiers should be equal to or lower than the layer of the current picture. Alternatively, the previous picture is defined as the previous picture in decoding order for which all scalability layer identifiers fulfills the condition that the layer identifiers should be equal to zero.

Alternatively, the previous reference picture to be used for determining the POC value is defined as a previous key picture in decoding order. A key picture is within this specification a picture that breaks prediction between pictures across the key picture. Example of H.264 and HEVC key pictures are IDR pictures, open-GOP I-pictures, switching point pictures or a picture that is identified as a key picture through explicit code words or by other means.

It should be obvious to a person skilled in the art that variations of the pseudo-codes above are possible within the scope of the embodiments of the present invention.

Accordingly, an encoder comprising one or more processors and e.g. one or more memories is configured to carry out the methods according to the embodiments is provided.

Figure 3:
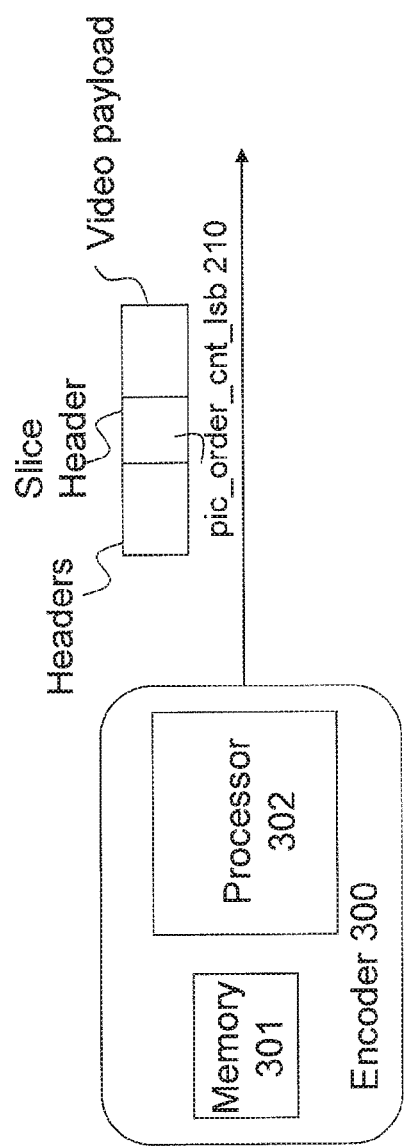
FIG. 3 illustrates schematically an encoder according to embodiments of the present invention.

FIG. 3 is a schematic diagram showing some components of the encoder 300. The encoder comprises a processor 302. The processor 302 could be any combination of one or more of a suitable central processing unit (CPU), multiprocessor, microcontroller, digital signal processor (DSP), application specific integrated circuit (ASIC) etc., capable of executing software instructions contained in a computer program stored in one or more memories 301.

Thus an encoder 300 configured to encode a representation of a current picture of a video stream of multiple pictures using reference pictures is illustrated in FIG. 3. The encoder comprises a processor 302 configured to assign a POC value indicating to a decoder the order in which the current picture should be output or displayed wherein each picture belongs to a layer identified by a layer identity.

According to yet further aspects, a decoder comprising one or more processors and e.g. one or more memories is configured to carry out the methods according to the embodiments is provided.

Figure 4:
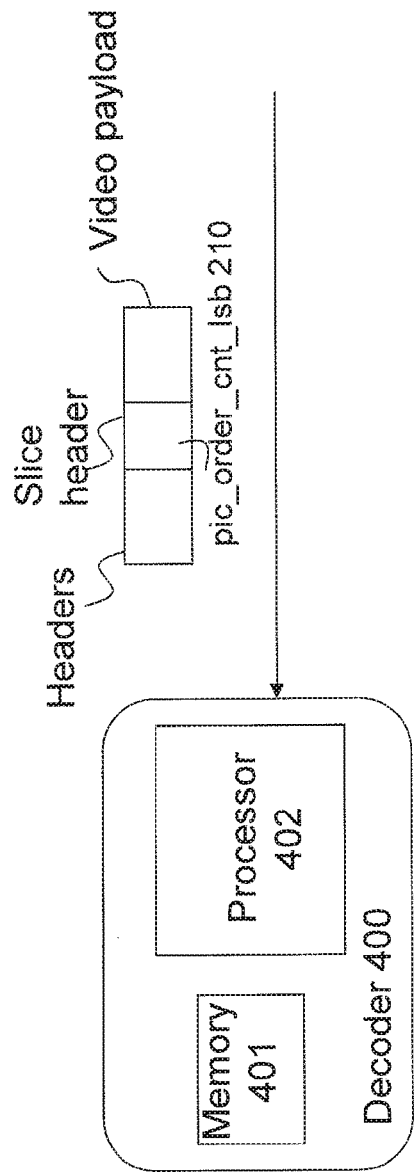
FIG. 4 illustrates schematically a decoder according to embodiments of the present invention.

FIG. 4 is a schematic diagram showing some components of the decoder 400. The decoder 400 comprises a processor 402. The processor 402 could be any combination of one or more of a suitable central processing unit (CPU), multiprocessor, microcontroller, digital signal processor (DSP), application specific integrated circuit (ASIC) etc., capable of executing software instructions contained in a computer program stored in one or more memories 401.

Thus a decoder 400 configured to decode a representation of a current picture of a video stream of multiple pictures using reference pictures is provided according to a second and a fourth aspect. The decoder 400 comprises a processor 402 configured to assign a POC value indicating the order in which the current picture should be output or displayed and each picture belongs to a layer identified by a layer identity is provided. Further, the decoder 400 is configured to receive least significant bits of the POC (pic_order_cnt_lsb) 210, of the current picture from a bitstream from the encoder 300. The decoder comprises according to the second aspect a processor 402 that is further configured to determine the POC of the current picture, to be used by the decoder 400, as a sum of the pic_order_cnt_lsb 210 and most significant bits of the POC, PicOrderCntMsb, of the current picture, wherein the PicOrderCntMsb of the current picture is derived using at least a prevPicOrderCntMsb and a prevPicOrderCntLsb and the prevPicOrderCntMsb is set equal to the most significant bits of the POC of a previous reference picture in decoding order that has a layer identity equal to or lower than the layer identity of the current picture and prevPicOrderCntLsb is set equal to the value of the least significant bits of the POC of a previous reference picture in decoding order that has a layer identity equal to or lower than the layer identity of the current picture. The previous reference picture is the closest reference picture in decoding order that fulfils the requirement that it has a layer identity equal to or lower than the layer identity of the current picture.

According to the fourth aspect, the decoder 400 comprises a processor 402 configured to assign a POC value indicating the order in which the current picture should be output or displayed and each picture belongs to a layer identified by a layer identity is provided. Further, the decoder 400 is configured to receive least significant bits of the POC (pic_order_cnt_lsb) 210, of the current picture from a bitstream from the encoder 300. The decoder comprises according to the fourth aspect a processor 402 that is further configured to determine the POC of the current picture, to be used by the decoder 400, as a sum of the pic_order_cnt_lsb 210 and most significant bits of the POC, PicOrderCntMsb, of the current picture, wherein the PicOrderCntMsb of the current picture is derived using at least a prevPicOrderCntMsb and a prevPicOrderCntLsb and the prevPicOrderCntMsb is set equal to the most significant bits of the POC of a previous reference picture in decoding order that has a layer identity equal to zero and prevPicOrderCntLsb is set equal to the value of the least significant bits of the POC of a previous reference picture in decoding order that has a layer identity equal to zero. The previous reference picture is the closest reference picture in decoding order that fulfils the requirement that it has a layer identity equal to zero.

According to another embodiment, the layer is a temporal layer and the temporal layer identifier corresponds to temporal_id.

Alternatively, the previous reference pictures used for determining the POC value may be key pictures such as any of a IDR picture, open-GOP I-picture, switching point picture or pictures that are identified as key pictures through explicit code words.

It should be noted that POC and POC value is used interchangeably throughout the specification.

What is claimed is:

1. A method of decoding, in a decoder, a representation of a current picture of a video stream of multiple pictures using reference pictures, wherein each picture belongs to a layer identified by a layer identity, the method comprising:
  receiving least significant bits of a Picture Order Count (POC) value (pic_order_cnt_lsb) of the current picture from a bitstream; and
  determining the POC value of the current picture, to be used by the decoder, as a sum of the pic_order_cnt_lsb and most significant bits of the POC (PicOrderCntMsb) of the current picture;
  wherein the PicOrderCntMsb of the current picture is derived using at least a prevPicOrderCntMsb and a prevPicOrderCntLsb, where:
    prevPicOrderCntMsb is set equal to PicOrderCntMsb of a previous reference picture in decoding order that has a layer identity equal to zero; and
    prevPicOrderCntLsb is set equal to the value of pic_order_cnt_lsb of the previous reference picture.

2. The method of claim 1 wherein the previous reference picture is the closest reference picture in decoding order that has a layer identity equal to zero.

3. The method of claim 1 wherein the layer is a temporal layer and the temporal layer identity corresponds to temporal_id.

4. A decoder configured to decode a representation of a current picture of a video stream of multiple pictures using reference pictures, wherein each picture belongs to a layer identified by a layer identity, wherein the decoder is configured to receive least significant bits of a Picture Order Count (POC) value (pic_order_cnt_lsb) of the current picture from a bitstream, the decoder comprising:
  a processor configured to determine the POC value of the current picture as a sum of the pic_order_cnt_lsb and most significant bits of the POC value (PicOrderCntMsb) of the current picture;
  wherein the PicOrderCntMsb of the current picture is derived using at least a prevPicOrderCntMsb and a prevPicOrderCntLsb, where:
    prevPicOrderCntMsb is set equal to the most PicOrderCntMsb of a previous reference picture in decoding order that has a layer identity equal to zero;
    prevPicOrderCntLsb is set equal to the value of pic_order_cnt_lsb of the previous reference picture.

5. The decoder of claim 4 wherein the previous reference picture is the closest reference picture in decoding order that has a layer identity equal to zero.

6. The decoder of claim 4 wherein the layer is a temporal layer and the temporal layer identity corresponds to temporal_id.

* * * * *

UNITED STATES PATENT AND TRADEMARK OFFICE
CERTIFICATE OF CORRECTION

PATENT NO. : 10,893,288 B2
APPLICATION NO. : 16/859327
DATED : January 12, 2021
INVENTOR(S) : Samuelsson et al.

It is certified that error appears in the above-identified patent and that said Letters Patent is hereby corrected as shown below:

In the Specification

In Column 1, Line 8, delete "2012," and insert -- 2012, now Pat No. 10,674,171, --, therefor.

In Column 1, Line 61, delete "to" and insert -- from --, therefor.

In Column 3, Line 8, delete "that is" and insert -- is --, therefor.

In Column 6, Lines 24-25, delete "log 2_max_pic_order_cnt_lsb_minus4" and insert -- log2_max_pic_order_cnt_lsb_minus4 --, therefor.

In Column 6, Line 37, delete "the the current" and insert -- the current --, therefor.

Signed and Sealed this
Sixth Day of April, 2021

Drew Hirshfeld
*Performing the Functions and Duties of the
Under Secretary of Commerce for Intellectual Property and
Director of the United States Patent and Trademark Office*